United States Patent [19]

Oetiker

[11] 4,413,846
[45] Nov. 8, 1983

[54] HOSE COUPLING

[76] Inventor: Hans Oetiker, Oberdorfstrasse 21, Horgen, 810

[21] Appl. No.: 257,321

[22] Filed: Apr. 24, 1981

[51] Int. Cl.[3] .................... F16L 39/00; F16L 37/00
[52] U.S. Cl. ................................ 285/317; 285/308; 285/DIG. 25
[58] Field of Search ............... 285/308, 317, DIG. 25

[56] References Cited

U.S. PATENT DOCUMENTS

| | | | |
|---|---|---|---|
| 2,099,335 | 11/1937 | Hansen | 285/308 X |
| 2,722,399 | 11/1955 | Oetiker | 285/308 X |
| 3,453,005 | 7/1969 | Foults | 285/DIG. 25 |
| 3,574,359 | 4/1971 | Klein | 285/DIG. 25 |
| 4,035,005 | 7/1977 | DeVincent et al. | 285/DIG. 25 |

*Primary Examiner*—Richard J. Scanlan, Jr.

*Attorney, Agent, or Firm*—Craig & Burns

[57] ABSTRACT

A coupling with a latching mechanism for holding a nipple inserted into the coupling member in its connected position by engaging with a shoulder surface of the nipple; a safety locking mechanism in the coupling member includes a locking member that is in its operable position before the latching mechanism releases the nipple so that the shoulder surface is securely pressed against the locking member by the back pressure in the line until the back pressure decreases to a safe level; the latching mechanism and safety locking mechanism thereby include each a spring of such strength that the spring of the latching mechanism will overcome the spring of the safety locking mechanism when the back pressure has substantially decreased so as to automatically release the nipple for complete disengagement.

20 Claims, 5 Drawing Figures

HOSE COUPLING

The present invention relates to a hose coupling, and more particularly to a safety latching and locking arrangement for such couplings.

My prior U.S. Pat. Nos. 2,722,399; 2,795,438; and 3,858,910 are representative of prior art hose couplings which permit a connection and disconnection of a male coupling member with and from a female coupling member. It is also known that during the disconnection of couplings of this type for compressed air and other gases under high pressure, back pressures may result, particularly with long hose lines so that the suddenly released nipple is shot like a bullet out of the coupling and may thereby cause extremely dangerous injuries. In order to prevent such injuries, various proposals have been made heretofore which can be generally described as follows. With couplings equipped with a bayonet-type locking mechanism, a so-called safety chamber may be arranged ahead of the normal coupling housing in which the cutouts for the bayonet cams are rotated through 180° so that the connecting nipple cannot fly out of the housing immediately during the disengagement. In couplings with ball-type safety mechanisms, two rows of annularly arranged balls are provided in such a manner that the first row of balls holds up the connecting nipple during the disengagement until the coupling has been vented, i.e., the pressure in the hose line connected to the coupling has decreased to a safe level. Finally, a connecting nipple has also been proposed to be equipped with a valve so that during disengagement the hose is not vented at all or is vented or bled only slowly.

While these prior art safety mechanisms represented a considerable progress in the safety of such couplings, they entailed considerable disadvantages. More specifically, the arrangement of a so-called safety chamber ahead of the coupling housing itself is relatively complicated and expensive. Couplings with ball latching arrangements of the type mentioned above are not only inadequately vibration-resistant, but also are prone to failures and additionally cannot be used with the safest type of release or disconnecting mechanism which involves a rotatable ring, as disclosed, for example, in my prior U.S. Pat. No. 2,795,438. Finally, the provision of a valve not only increases the cost of the hose coupling, but additionally represents an increase in flow resistance which is objectionable from an energy consumption point of view.

Accordingly, the present invention is concerned with the task to provide a hose coupling of the type described above which avoids reliably the aforementioned shortcomings and drawbacks by simple and relatively inexpensive means, that can be easily operated by any person, including persons without particular skill. Additionally, the present invention seeks a safety mechanism for couplings with rotatable release mechanisms which is favorable from a price point of view and assures a sturdy blocking of the release of the nipple until the pressure in the hose has been substantially completely bled.

Broadly speaking, the present invention is characterized in that a shoulder formed on the male coupling member, which is adapted to engage with a first abutment surface when the male coupling member is in the fully engaged position, is adapted to engage initially with a second abutment surface which is axially spaced to the rear of the first abutment surface in the disengaging direction of the male coupling member, when the male coupling member is released from engagement with the first abutment surface in order to prevent the immediate complete disengagement of the male coupling member from the female coupling member while strong pressures may still exist in the line system connected to the coupling so as to permit the pressure to first bleed off and therewith prevent the danger of serious injury before the male coupling member can be fully disengaged from the female coupling member.

In a particularly simple realization according to the present invention, the first abutment surface is formed by a latching member spring-loaded in the radially inward direction within a recess machined into the female coupling member while the second abutment surface is formed by a safety locking member also spring-loaded in the radially inward direction within a slot milled into the coupling housing axially toward the rear in the disengaging direction of the male coupling member with respect to the recess accommodating the latching member. The slot accommodating the safety locking member, like the recess accommodating the latching member, extends up to the bore for the nipple to intersect with such bore. The safety locking member, which is a flat, preferably hardened steel member, is inserted into the slot and is pressed into its normally engaging position by a compression spring so that the abutment surface formed by the safety locking member is adapted to be engaged by a shoulder on the male coupling member when the latter is released from its engagement with the latching member. The flat steel member forming the safety locking member thereby prevents initially complete disengagement of the male coupling member from the female coupling member when the latching member is actuated to release the male coupling member in order to enable a decrease of any pressure still existing in the line system connected to the coupling. According to a particularly simple and effective construction in accordance with the present invention, the control of the safety mechanism is thereby made in such a manner that the safety locking member is always released into its locking position before the latching member has been lifted completely to release the nipple so that once the nipple is released by the latching member, the back pressure of the gas in the hose line will securely press or wedge the nipple against the corresponding abutment surface of the safety locking member until such time as the pressure in the line has decreased to a safe level. According to a further feature of the present invention, the spring normally urging the latching member into its latching position is stronger than the spring urging the safety locking member into its locking position so that upon substantial disappearance of the pressure in the line connected to the coupling, the stronger spring will overcome the force of the weaker spring and therewith cause automatic release of the nipple. If the actuating mechanism consists, for example, of a rotatable member provided with inwardly projecting finger-like entrainment members, then the rotatable member may serve at the same time for lifting the latching member out of its normal latching position by engagement with one of said finger-like entrainment members after the other finger-like entrainment member has released the safety locking member from its inoperable position in which it is held by the other finger-like entrainment member, into its locking position.

These and other objects, features and advantages of the present invention will become more apparent from the following description when taken in connection with the accompanying drawing which shows, for purposes of illustration only, two embodiments in accordance with the present invention, and wherein.

Figure 1:
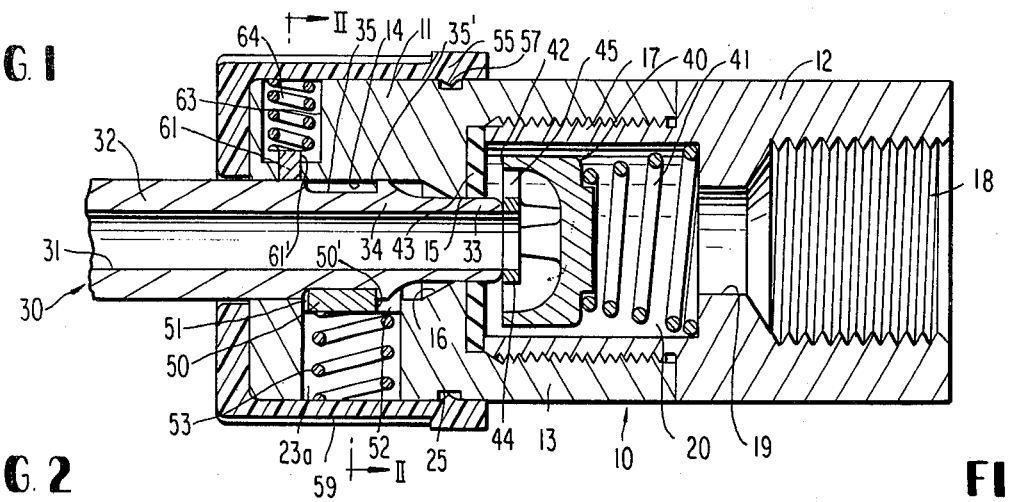
FIG. 1 is a longitudinal axial cross-sectional view through a first embodiment of a hose coupling provided with a safety mechanism in accordance with the present invention.

Referring now to the drawing wherein like reference numerals are used throughout the various views to designate like parts, reference numeral 10 generally designates therein a two-partite female coupling member consisting of a left coupling part 11 and of a right coupling part 12 which are threadably secured together by the internally threaded portion provided in the external sleeve-like extension 13 of left coupling part 11 and the externally threaded portion of the sleeve-like extension 17 of right coupling part 12. The left coupling part 11 is provided with an internal bore 14, the diameter of which is related to the size of the male coupling member or connecting nipple generally designated by reference numeral 30 adapted to be received therein. Bore 14 in the coupling part 11 is connected with the reduced bore section 15 by way of the tapered bore section 16. The right coupling part 12 is provided with a threaded connecting bore 18 for connection with the pressure line and leads to chamber 20 formed within extension 17 by way of bore 19 of reduced diameter. As can be seen best in FIG. 2, the coupling part 11 is also provided with two axially spaced recesses 23a and 23b milled in at right angle into the coupling part 11, of which the milled-in recess 23a intersects with its imaginary chord the internal bore 14, i.e., breaks through the wall of the coupling part 11 to provide a direct communication between the inside of the bore 14 and the milled-out recess 23a. Additionally, the left coupling part 11 is provided with an annular groove 25 for purposes to be explained hereinafter.

The male coupling member or connecting nipple generally designated by reference numeral 30 is provided with an internal bore 31 for conducting therethrough the medium under pressure and includes a first portion 32 of larger external diametric dimensions which terminates in an end portion of reduced external diametric dimension 33 by way of a tapered section 34. Additionally, the male coupling member 30 is provided with a circumferentially extending groove 35 at such location that it will be in substantial axial alignment with the milled-in recess 23a when the connecting nipple 30 is in its engaged position shown in FIG. 1. The circumferentially extending groove 35, as can be seen best in FIG. 1, forms a substantially right angle between its forward abutment surface 35' and bottom surface of the groove 35 while its rear end surface passes over into the bottom surface by way of a rounded-off portion.

To keep the pressure line (not shown), which is normally connected with the female coupling member 10, closed when no connecting nipple 30 is inserted and thereby avoid energy losses, a valve member generally designated by reference numeral 40 is provided within the chamber 20 which is urged into its closing position by spring 41 in such a manner that the annular sealing surface 42 thereof engage the annular seal 43 suitably seated in a corresponding recess provided in the female coupling part 11. An annular actuating disk 44 integral with the valve structure 40, for example, by way of support ribs 45, is adapted to be engaged by the free end face of the connecting nipple 30 when the latter is inserted into the bore 14 of the left coupling part 11 so as to open the valve structure 40 when the connecting nipple 30 reaches its engaged, locked position shown in FIG. 1.

The latching arrangement for latching the nipple 30 in its connected position involves three parts; namely, the latching member 50 (FIG. 3) which forms a latching abutment surface 50', is made from flat sheet-metal material and is basically rectangular, a coil spring 53, and a cap-like member generally designated by reference numeral 55 made of any suitable plastic material. For ease of assembling the male connecting member or nipple 30 with the female coupling part 10, the latching member 50 is provided with an approximately V-shaped notch 51 in its rear end face, as viewed in the inserting direction of the connecting nipple, while its opposite forward end face is provided with a flattened, approximately U-shaped cutout 52 to assure secure locking of the parts 10 and 30.

Two inwardly projecting entrainment members 56a and 56b as also a bead-like annular enlargement or spaced enlargements 57 are formed in one piece with the cap-like member 55 by being molded integrally therewith. A serrated or knurled external configuration 59 (FIG. 1) of the cap-like member 55 is also readily feasible by the use of an appropriate mold.

The coupling so far described operates very satisfactorily to connect the nipple 30 with the coupling member 10 also under high pressure in the line connected to the coupling member 10. Moreover, the disconnection of the nipple 30 from the coupling member 10 does not pose any problems, as such, with the coupling structure so far described. However, for purposes of additional safety, the present invention further includes a safety mechanism which prevents with certainty any accidents that may otherwise occur as a result of the pressure force present during the disconnection operation in the hose line connected to the coupling member which might cause the nipple 30 to be shot out of the coupling member 10, once the latching member 50 is released by engagement of the finger-like projection 56a with the free end of latching member 50 during rotation of the cap-like member 55 in the counterclockwise direction (FIG. 3). The safety mechanism according to the present invention consists of a safety locking member 61 which is of relatively flat and rectilinear configuration and forms a safety locking abutment surface 61'. The safety locking member 61 is slidably accommodated within a narrow rectangular slot 62 (FIGS. 2 and 3) machined into the coupling part 11 which also intersects with its imaginary chord the bore 14, i.e, provides a direct communication between the inside of bore 14 and milled-out recess 62. As can be seen from FIG. 1, the recess 23a and therewith the latching member 50 is located nearer the free end of the inserted nipple 30 than the recess 62 and therewith the safety locking member 61. In other words, in the disengaging direction of nipple 30, the safety locking member 61 is located axially spaced to the rear of the latching member 50 with respect to shoulder 35'. A bore 63 which communicates at its inner end with slot 62, accommodates a spring 64 which normally urges the locking member 61 into its locking position. The slot 62 can thereby be so located in the axial direction relative to annular groove 35 that the locking member 61 is held in the position shown in FIG. 2, in which it barely fails to intersect the bore 14 when the nipple 30 is in its connected position shown in FIG. 1. In the alternative, the slot 62 may be so axially located relative to recess 23a that the locking member 61, held in its barely retracted position by finger-like projection or member 56b in the position shown in FIG. 2, is able to drop into recess 35 as soon as rotation of the cap-like member 55 has started in the counterclockwise direction. In other words, slot 62 may also be located slightly to the right of its position shown in FIG. 1. In the former case, the size and location of finger-like projections or entrainment members 56a and 56b is less critical and a certain play of the cap-like member 55 in its rotational movements is possible. In the latter case, the entrainment members 56a and 56b must be located with greater accuracy as shown in FIG. 2. The locking member 61 may be made of any suitable material, for example, hardened steel. The spring 64 is thereby intentionally selected weaker than spring 53 for reasons that will become more apparent hereinafter.

Figure 2:
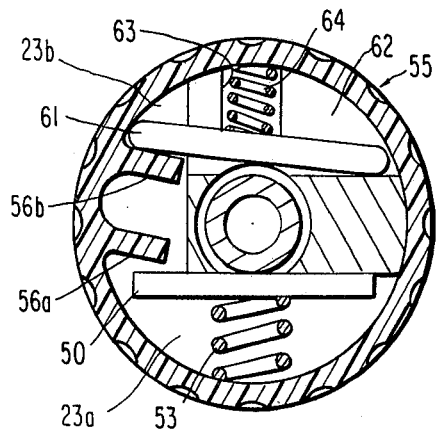
FIG. 2 is a transverse cross-sectional view, taken along line II—II of FIG. 1, showing the various parts thereof in their position when a nipple has been completely engaged and air is able to flow from the coupling member through the nipple into the hose connected to the latter.
Figure 3:
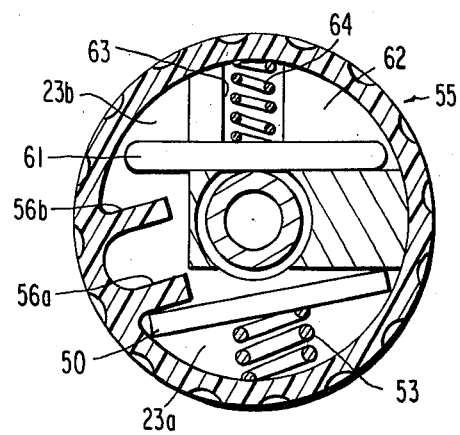
FIG. 3 is a transverse cross-sectional view, similar to FIG. 2, and illustrating the parts thereof when the safety locking member holds the nipple within the coupling member.

The parts of the coupling are shown in FIGS. 1 and 2 in the locked, connected condition in which the spring-loaded latching member 50 prevents movement of the connecting nipple 30 in the disengaging direction, i.e., to the left in FIG. 1 by engaging with its lower surface against the bottom surface of the U-shaped cut-out 52 and with its forward end face or abutment surface 50' against a corresponding portion of the shoulder surface 35' of annular groove 35. The safety locking member 61 is thereby in the barely retracted position shown in FIG. 2, in which it is held by finger-like porton 56b and/or the external surface of nipple section 32. In order to disengage the connecting nipple 30, it is only necessary to rotate the cap-like member 55 in the counterclockwise direction into the position shown in FIG. 3, in which case the entrainment member 56a engages with the left free end of the latching member 50, lifting it out of the groove 35 against the force of spring 53 and therewith preparing the nipple 30 for disconnection. However, before the latching member 50 is retracted sufficiently by engagement with finger-like projection 56a to fully release latching engagement of the nipple 30, the safety locking member 61 is released by finger-like projection 56b so that once the nipple 30 starts to move to the left in FIG. 1, the shoulder surfaces 35' of nipple 30 will be securely wedged or pressed against the abutment surface 61' of the safety locking member 61 by the pressure in the hose line connected to the coupling member 10 until practically no pressure force exists any longer on nipple 30, i.e., the safe condition has been reached. This wedging or pressing action, of course, also holds the cap-like member 55 in the position illustrated in FIG. 3 since this wedging or pressing action is much greater than the force which cann be exerted by spring 53. Once the wedging or pressing force has disappeared by the bleeding or venting of the hose line connected to coupling member 10, the force of the stronger spring 53 will overcome the force of the weaker spring 64 and will thus automatically cause the cap-like member 55 to return to its normal position shown in FIG. 2, thereby enabling completion of the disconnection of nipple 30 from coupling member 10.

It can be seen from the foregoing that the same cap-like member 55 with its finger-like projections or entrainment members 56a and 56b thus controls the latching member 50 as also the safety locking member 61, and more particularly in such a manner that the safety locking member 61, which is under a weaker spring force (spring 64) than the latching member 50 (spring 53), is barely retracted in the normal position (FIG. 2), whereas during rotation of the cap-like member 55 in the counterclockwise direction (FIGS. 2 and 3), i.e. during the disconnection operation, the safety locking member 61 is immediately caused to intersect the bore 14 by the force of spring 64 which now is no longer opposed by the force of spring 53. The control according to the present invention is thereby in such a manner that the safety locking member 61 is always released already long before the latching member 50 is completely retracted or lifted out of groove 35 to release disengaging movement of the nipple 30. The abutment surface 61' of the safety locking member 61 thereby reliably holds up the complete disconnection or release of the nipple 30 by lateral pressing or wedging action of its shoulder surface 35' against this abutment surface 61' of the safety locking member 61 until no back pressure exists any longer in the hose line due to bleeding or venting thereof, in which case the stronger spring force of spring 53 causes rotation of the cap-like member 55 in the clockwise direction as viewed in FIG. 3, which in turn causes retraction of safety locking member 61, whence the coupling can be disconnected in a pressureless condition and without danger. The spring 53 is thereby so strong that the safety locking member 61 is again pushed back into its normal position (FIG. 2), once the back pressure in the hose has decreased sufficiently, and thus automatically releases the nipple 30 when safe conditions have been reached. Thus, the actuation and handling of the coupling in accordance with the present invention is foolproof and can be disengaged with one hand only without any danger to the operating personnel.

Thus, the safety coupling of the present invention also cannot become disconnected by itself, i.e., inadvertently, when the compressed air line or the like is pulled around, for example, in a plant as is the case with various other prior art couplings. During disconnection, the nipple can no longer be shot out of the coupling by the pressure in the line, which prevents reliably any accidents. These advantages can be achieved by the coupling of this invention in a price-favorable, accident-safe manner since the coupling of this invention is relatively inexpensive to manufacture and assemble and offers great ease of handling by even relatively unskilled personnel.

It is readily apparent from the foregoing that the latching and safety locking arrangement in accordance with the present invention as illustrated in FIGS. 1–3 is extremely simple to manufacture and to assemble. Additionally, the arrangement according to FIGS. 1–3 also permits ready accommodation of connecting nipples of different diameters over a relatively wide cross-sectional area ratio exceeding the ratio of 2:1. Furthermore, standardization of the parts is far-reachingly possible. Finally, by using plastics material of different color, readily realized by different color additives to the same basic material, for example, for the cap-like member 55, the particular intended use of the coupling can be made easily recognizable, e.g., blue for compressed air, red for oxygen, etc.

Figure 4:
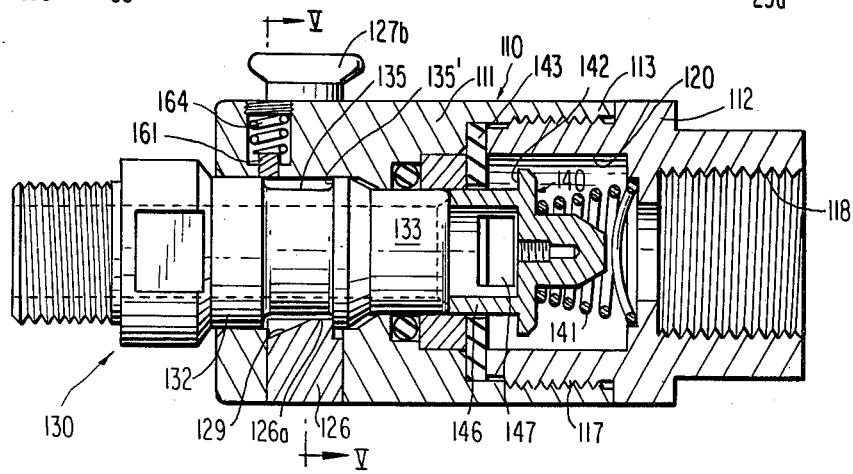
FIG. 4 is a longitudinal axial cross-sectional view through a modified embodiment of a coupling with a safety mechanism in accordance with the present invention.
Figure 5:
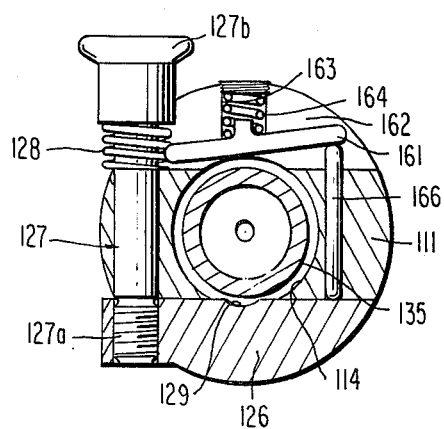
FIG. 5 is a transverse cross-sectional view taken along line V—V of FIG. 4.

While FIGS. 1–3 illustrate a particularly simple and cost-favorable embodiment of a coupling with a safety mechanism according to the present invention, the latter is not limited thereto but is equally applicable to other prior art couplings. FIGS. 4 and 5 illustrate a typical prior art coupling equipped with a safety mechanism in accordance with the present invention in which similar parts are designated by corresponding reference numerals of the 100 series which operate in a similar manner and therefore will not be described in detail. Differing from FIGS. 1–3, the valve member generally designated by reference numeral 140 includes an annular actuating portion 146 adapted to be engaged by the free end of nipple 130 and provided with one or preferably several connecting apertures 147 establishing a communication between chamber 120 and the inside of annular portion 146 which in turn communicates with the bore in nipple 130. Additionally, the coupling 110 of FIGS. 4 and 5 includes a latching member 126 having a latching portion 126a, properly speaking, which extends in its normal position (FIG. 5) chord-like into the bore 114 to engage with the shoulder surface 135' formed by groove 135 in nipple 130. An actuating member generally designated by reference numeral 127 is threadably connected at its lower end at 127a with latching member 126 and includes at its upper exposed end a push-button portion 127b. The latching member 126 is constrained to rectilinear movements by any conventional means (not shown) when the push-button part 127b is depressed against the force of spring 128 which urges the parts of the latching mechanism into their normal latching position. A pin 166 slidable within coupling housing part 111 rests with its lower surface on latching member 126 and engages with its upper surface the free, right end of safety locking member 161. With the nipple 130 in the connected, latched position in coupling 110, as illustrated in FIGS. 4 and 5, the upper end of pin 166 lifts the safety locking member 161 just barely out of intersection with bore 114. When the actuating member 127 is now depressed to initiate the disengaging operation, downward movement of pin 166 will immediately release the safety locking member 161 into its operable safety position before the latching portion 126a releases the nipple 130 so that the latter is again reliably pressed or wedged against the safety locking member 161 by any existing back pressure until the pressure in the line has disappeared, whereupon the force of the stronger spring 128 will again overcome the force of the weaker spring 164. Thus, the safety mechanism 161, 162, 163, 164, 166 of this embodiment fulfills the intended safety feature in the same manner as the safety mechanism of FIGS. 1–3. To facilitate connection of the nipple 130 with coupling member 110, the coupling part 111 is provided with an arcuate surface portion 129 which widens and deepens in the direction toward the left in FIG. 4 and terminates at the right end in latching portion 126a, properly speaking.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A locking arrangement for a coupling in which a male coupling member provided with an external annular groove is adapted to be inserted into a bore of a female coupling member whose bore is in direct communication with the outer surface of the female coupling member by way of a cutout whose imaginary chord-like inner end intersects said bore, and which includes latching means for holding the male coupling member in its connected position relative to the female member, when said cutout is in substantial axial alignment with said external annular groove by extending through said cutout into engagement with the shoulder surface formed by said annular groove, and actuating means on said female coupling member operable to engage with said latching means for withdrawing said latching means from said external annular groove to enable disengagement of said male coupling member from said female coupling member, characterized in that a safety locking means is provided in the female coupling member which prevents complete disengagement of the male coupling member from said female coupling member upon actuation of said actuating means until substantial decrease of pressure in a line connected to the female coupling member, said safety locking means including a locking member inserted into a slot provided in said female coupling member behind said cutout in the disengaging direction of said male member, said slot intersecting said bore, a spring in said female coupling member normally urging said safety locking member into its locking position, and further means operatively connecting said actuating means with said locking member in such a manner that said locking manner is normally held out of intersecting said bore but upon actuation of said actuating means is released before complete release of said male coupling member by said latching means so that said male coupling member is pressed with its shoulder surface against said locking member by pressure existing in a line connected to said female coupling member to enable a decrease of said pressure.

2. An arrangement according to claim 1, wherein a spring normally urges said locking means into the latching condition, the spring for said latching means being stronger than the spring for said safety locking member to return the parts of the latching and locking arrangement automatically to their normal condition when substantial pressure decrease has been attained.

3. An arrangement according to claim 2, wherein said locking member is a relatively flat part made from steel.

4. An arrangement according to any one of claims 1, 2, or 3, characterized in that said actuating means includes a cap-like member rotatable on said female coupling member, said cap-like member having inwardly extending projections operable to engage respectively with the latching means and the locking member, the projection engaging with said locking member forming part of said further means.

5. An arrangement according to claim 4, characterized in that said cap-like member is provided near its axially free end with radially inwardly extending, bead-like means operable to engage by snap-in action into a circumferential groove provided in said female coupling member to fasten said cap-like member in a rapidly detachable manner relative to said female coupling member.

6. An arrangement according to claim 4, characterized in that said cap-like member and projections constitute a one-piece integrally molded synthetic resinous part.

7. An arrangement according to claim 6, characterized in that said projections have limited elasticity to enable only limited elastic deflections.

8. An arrangement according to claim 1, 2, or 3, wherein said further means includes a pin coupling said latching means with said locking member.

9. An arrangement according to claim 8, wherein said latching means is constrained to substantially rectilinear movement relative to said female coupling member.

10. An arrangement according to claim 9, wherein said actuating means includes a spring-loaded push-button type actuating member.

11. An arrangement for latching and locking a male connecting member adapted to be inserted into a bore of a female coupling member, characterized in that the coupling member is provided with two cutout portions, said cutout portions intersecting and breaking through a portion of the wall forming said bore to provide a direct communication between said bore and the outside of said female coupling member, a latching member loosely inserted into one cutout portion, a spring loosely placed over said latching member and operable to urge the latter inwardly, a safety locking member loosely inserted into said outer cutout portion, a spring loosely placed over said locking member, and cap means on said female coupling member, said cap means externally covering said cutout portions and said springs and holding said springs in place in the stressed condition thereof.

12. An arrangement according to claim 11, characterized in that said cap means fulfills the triple functions (a) of cover for said springs and said latching and locking members, (b) of means for releasing the latching action of said latching member by an entrainment member formed integrally with said cap means and operable to engage with said latching member and (c) of enabling said locking member to assume its safety locking position before complete release of the male member by said latching member.

13. An arrangement according to claim 12, characterized in that the cap means includes inwardly projecting entrainment parts, one of which is operable to engage with the latching member and the other end of which is operable to engage with the safety locking member.

14. An arrangement according to claim 13, characterized in that said cap means and entrainment parts are integrally formed of plastic material.

15. A locking arrangement for a pressure-line coupling in which a male coupling member provided with shoulder means is adapted to be inserted into a bore of a female coupling member which includes first abutment surface means operable to engage with said shoulder means of the male coupling member for holding the latter in its engaged position relative to the female coupling member, and normally inoperable release means and operable upon actuation thereof to release said shoulder means from engagement with said first abutment surface means to thereby initiate disengagement of said male coupling member from said female coupling member, characterized in that said release means is spring-loaded into its normal position in which the shoulder means of the male coupling member is held in its engaged position relative to the female coupling member by engagement with said shoulder means, a second abutment surface means being provided in said female coupling member, said second abutment surface means being axially spaced from said first abutment surface means in the direction of disengagement of the male coupling member and being operable for engaging with said shoulder means upon actuation of said release means overcoming the spring-loading thereof to release the shoulder means from engagement with said first abutment surface means to thereby prevent immediate complete disengagement of the male coupling member from said female coupling member while pressure may still exist in the line system connected with the coupling, said second abutment surface means being automatically kept in engagement with said shoulder means by the pressure existing in the line and being operable to be rendered ineffectual by said release means to enable complete disengagement of the coupling.

16. A locking arrangement according to claim 15, in which the release means includes a rotatable member associated with said female coupling member which is rotated in one direction to initiate release of the male coupling member from the female coupling member.

17. A locking arrangement for a coupling in which a male coupling member provided with shoulder means is adapted to be inserted into a bore of a female coupling member which includes first abutment surface means operable to engage with said shoulder means of the male coupling member for holding the latter in its engaged position relatve to the female coupling member, a release means operable to release said shoulder means from engagement with said first abutment surface means to thereby initiate disengagement of said male coupling member from said female coupling member, characterized in that a second abutment surface means is provided in said female coupling member, said second abutment surface means being axially spaced from said first abutment surface means in the direction of disengagement of the male coupling member and being operable for engaging with said shoulder means upon release of the shoulder means from engagement with said first abutment surface means to thereby prevent immediate complete disengagement of the male coupling member from said female coupling member while pressure may still exist in the line system connected with the coupling, said second abutment surface means being operable to be rendered ineffectual by said release means to enable complete disengagement of the coupling, the release means including a rotatable member associated with said female coupling member which is rotated in one direction to initiate release of the male coupling member from the female coupling member, and the rotatable member being rotated in the opposite direction to complete release of the male coupling member from the female coupling member.

18. A locking arrangement for a coupling in which a male coupling member provided with shoulder means is adapted to be inserted into a bore of a female coupling member which includes first abutment surface means operable to engage with said shoulder means of the male coupling member for holding the latter in its engaged position relative to the female coupling member, a release means operable to release said shoulder means from engagement with said first abutment surface means to thereby initiate disengagement of said male coupling member from said female coupling member, characterized in that a second abutment surface means is provided in said female coupling member, said second abutment surface means being axially spaced from said first abutment surface means in the direction of disengagement of the male coupling member and being operable for engaging with said shoulder means upon release of the shoulder means from engagement with said first abutment surface means to thereby prevent immediate complete disengagement of the male coupling member from said female coupling member while pressure may still exist in the line system connected with the coupling, said second abutment surface means being operable to be rendered ineffectual by said release means to enable complete disengagement of the coupling, and the release means including a push-button type member.

19. A locking arrangement for a coupling in which a male coupling member provided with shoulder means is adapted to be inserted into a bore of a female coupling member which includes first abutment surface means operable to engage with said shoulder means of the male coupling member for holding the latter in its engaged position relative to the female coupling member, release means operable to release said shoulder means from engagement with said first abutment surface means to thereby initiate disengagement of said male coupling member from said female coupling member, characterized in that a second abutment surface means is provided in said female coupling member, said second abutment surface means being axially spaced from said first abutment surface means in the direction of disengagement of the male coupling member and being operable to automatically prevent complete disengagement of said male coupling member from said female coupling member by pressure still existing in the line system which would otherwise occur upon actuation of the release means, said second abutment surface means being operable to be rendered ineffectual by said release means to enable complete disengagement of the coupling only after substantial decrease of any pressure still existing in the line system.

20. A coupling according to claim 19, characterized in that said release means is inoperable to render said second abutment surface means ineffectual until the pressure in the line system has decreased below a certain value.

* * * * *